(12) United States Patent
Martins da Costa (10) Patent No.: US 10,999,428 B2
(45) Date of Patent: May 4, 2021

(54) VERIFICATION OF ROUTING SCRIPTS FOR A DYNAMIC ROUTING ENGINE OF AN AUTOMATIC CALL DISTRIBUTION SYSTEM

(71) Applicant: Dell Products L.P., Round Rock, TX (US)

(72) Inventor: Jean Felipe Martins da Costa, Porto Alegre (BR)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/417,822

(22) Filed: May 21, 2019

(65) Prior Publication Data

US 2020/0374389 A1  Nov. 26, 2020

(51) Int. Cl.
*H04M 3/32* (2006.01)

(52) U.S. Cl.
CPC ........ *H04M 3/323* (2013.01); *H04M 2203/15* (2013.01); *H04M 2203/40* (2013.01)

(58) Field of Classification Search
USPC ...................................................... 379/10.03
See application file for complete search history.

(56) References Cited

U.S. PATENT DOCUMENTS

| | | | |
|---|---|---|---|
| 6,850,614 B1* | 2/2005 | Collins | H04M 3/5166 379/265.02 |
| 7,783,030 B1* | 8/2010 | Bruening | H04M 3/5237 379/266.07 |
| 2009/0285382 A1* | 11/2009 | Deng | H04L 45/00 379/221.08 |
| 2010/0235517 A1* | 9/2010 | Augustinos | H04L 65/4038 709/227 |

* cited by examiner

*Primary Examiner* — Amal S Zenati
(74) *Attorney, Agent, or Firm* — Terrile, Cannatti & Chambers; Emmanuel A. Rivera (57) ABSTRACT

A technology that facilitates implementation of verified routing scripts for a dynamic routing engine (DCE) of one or more automatic call distribution (ACD) systems is disclosed. Exemplary implementations may: emulate a DRE of one or more ACD systems; provide a training corpus to simulate inbound telephony calls to the DRE and simulate context of the simulated inbound telephony calls; obtain to-be-executed routing scripts; execute the routing scripts on emulated DRE with the provided training corpus to simulate inbound telephony calls to the DRE under the simulated context of the simulated inbound telephony calls; determine that the routing scripts executed within defined parameters; in response to the determination, verify the routing scripts; and provide the verified routing scripts for execution on a live DRE of one or more active ACD systems.

20 Claims, 4 Drawing Sheets

VERIFICATION OF ROUTING SCRIPTS FOR A DYNAMIC ROUTING ENGINE OF AN AUTOMATIC CALL DISTRIBUTION SYSTEM

BACKGROUND

Interactive Voice Response (IVR) is a system used to automate direct inbound telephony traffic and using scripting to dynamically route calls accordingly. Custom routing scripts can be written to advise callers of estimated wait times, any automated messages, and routing calls to live agents based on data associated with the caller and/or the call.

SUMMARY

One aspect of the present disclosure relates to a system configured to facilitate implementation of verified routing scripts for a Dynamic Routing Engine (DRE) of one or more Automatic Call Distribution (ACD) systems. The system may include one or more hardware processors configured by machine-readable instructions. The processor(s) may be configured to emulate a DRE of one or more ACD systems. The processor(s) may be configured to provide a training corpus to simulate inbound telephony calls to the DRE and simulate context of the simulated inbound telephony calls. The processor(s) may be configured to obtain to-be-executed routing scripts. The processor(s) may be configured to execute the routing scripts on emulated DRE with the provided training corpus to simulate inbound telephony calls to the DRE under the simulated context of the simulated inbound telephony calls. The processor(s) may be configured to determine that the routing scripts executed within defined parameters. The processor(s) may be configured to, in response to the determination, verify the routing scripts. The processor(s) may be configured to provide the verified routing scripts for execution on a live DRE of one or more active ACD systems.

Another aspect of the present disclosure relates to a method that facilitates implementation of verified routing scripts for a DRE of one or more ACD systems. The method may include emulating a DRE of one or more ACD systems. The method may include providing a training corpus to simulate inbound telephony calls to the DRE and simulate context of the simulated inbound telephony calls. The method may include obtaining to-be-executed routing scripts. The method may include executing the routing scripts on emulated DRE with the provided training corpus to simulate inbound telephony calls to the DRE under the simulated context of the simulated inbound telephony calls. The method may include determining that the routing scripts executed within defined parameters. The method may include, in response to the determination, verifying the routing scripts. The method may include providing the verified routing scripts for execution on a live DRE of one or more active ACD systems.

Yet another aspect of the present disclosure relates to a non-transient computer-readable storage medium having instructions embodied thereon, the instructions being executable by one or more processors to perform a method that facilitates implementation of verified routing scripts for a DRE of one or more ACD systems. The method may include emulating a DRE of one or more ACD systems. The method may include providing a training corpus to simulate inbound telephony calls to the DRE and simulate context of the simulated inbound telephony calls. The method may include obtaining to-be-executed routing scripts. The method may include executing the routing scripts on emulated DRE with the provided training corpus to simulate inbound telephony calls to the DRE under the simulated context of the simulated inbound telephony calls. The method may include determining that the routing scripts executed within defined parameters. The method may include, in response to the determination, verifying the routing scripts. The method may include providing the verified routing scripts for execution on a live DRE of one or more active ACD systems.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF THE DRAWINGS

The Detailed Description references the accompanying figures. In the figures, the left-most digit(s) of a reference number identifies the figure in which the reference number first appears. The same numbers are used throughout the drawings to reference like features and components.

DETAILED DESCRIPTION

A technology that facilitates implementation of verified routing scripts for a Dynamic Routing Engine (DRE) of one or more Automatic Call Distribution (ACD) systems are disclosed. Exemplary implementations may: emulate a DRE of one or more ACD systems; provide a training corpus to simulate inbound telephony calls to the DRE and simulate context of the simulated inbound telephony calls; obtain to-be-executed routing scripts; execute the routing scripts on emulated DRE with the provided training corpus to simulate inbound telephony calls to the DRE under the simulated context of the simulated inbound telephony calls; determine that the routing scripts executed within defined parameters; in response to the determination, verify the routing scripts;

and provide the verified routing scripts for execution on a live DRE of one or more active ACD systems.

Figure 1:
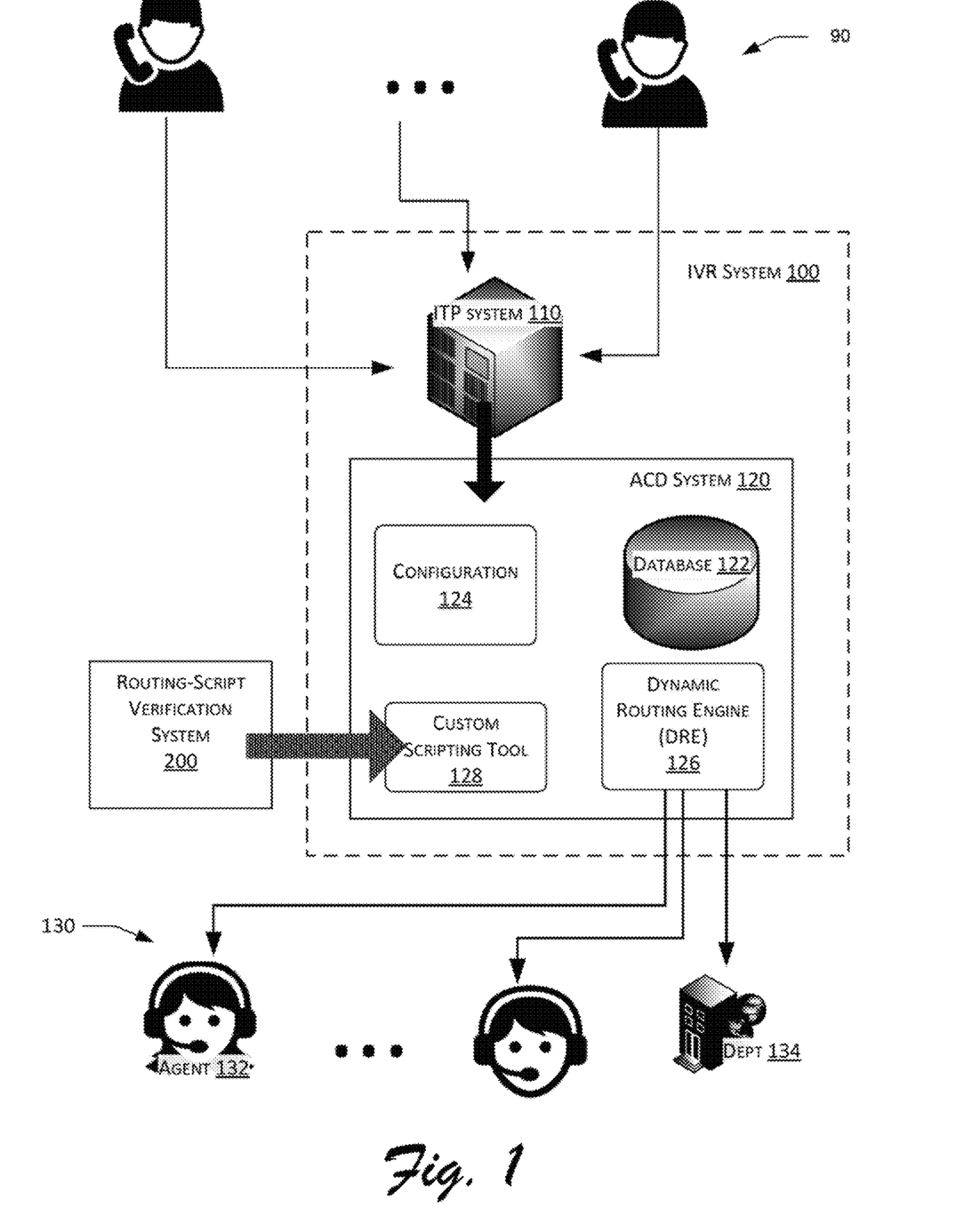
FIG. 1 illustrates an example Interactive Voice Response (IVR) system suitable to work with system configured to facilitate implementation of verified routing scripts for a Dynamic Routing Engine (DRE) of one or more Automatic Call Distribution (ACD) systems, in accordance with one or more implementations.

FIG. 1 illustrates an example Interactive Voice Response (IVR) system 100 that is configured to automate direct inbound telephony traffic and using scripting to dynamically route calls accordingly. The example IVR system 100 is suitable for an example routing-script verification system 200, which is discussed below.

As depicted, the example IVR system 100 includes an inbound traffic processing (ITP) system 110 and an automatic call distribution (ACD) system 120. An example of a suitable IVR system (like that of example IVR system 100) includes the products and solutions offered by AVAYA.

The ITP system 110 receives multiple inbound telephony calls from callers 90. The ITP system 110 interacts with the callers 90. In doing so, it may gather information from or about the callers 90. The ITP system 110 may accept a combination of voice telephone input and touch-tone keypad selection and provide the appropriate responses in the form of voice, fax, callback, email and other contact methods.

The ITP system 110 may provide prerecorded voice responses for appropriate situations, keypad signal logic, access to relevant data and, potentially, the ability to record voice input for later use. The ITP system 110 enables an organization to use prerecorded greetings or menu options that a caller can access through a phone keypad. The ITP system 110 may include speech recognition software to enable a caller to communicate with a computer.

The ACD system 120 includes a database 122, configuration data and rules 124, a Dynamic Routing Engine (DRE) 126, and a custom scripting tool 128. As the name implies, the ACD system 120 determines where and how best to route an incoming call based on a multitude of factors, rules, and conditions. For example, the ACD system 120 may route incoming calls to the most qualified employee or employees within a company that can address a caller's needs.

The ACD system 120 may use rule-based instructions based on contextual data, such as caller ID, automatic number identification, interactive voice response or dialed number identification services to determine how calls are handled. The ACD system 120 may be found in offices that handle large volumes of incoming phone calls from callers who have no need to talk to a specific person but require assistance from any of multiple persons at the earliest opportunity. Examples of such situations include customer service representatives or emergency services dispatch centers.

The database 122 may include relevant contextual data (e.g., regarding identified callers). The configuration data and rules 124 may include data and rules regarding the operation of the ACD system 120. For example, they may include the business rules that direct the actions of the DRE 126 in routing the call to the proper recipient, such as recipients 130, while achieving other goals (such as traffic load balancing). The configuration data and rules 124 may includes metrics, destinations, rules, and features.

The DRE 126 provides dynamic call routing across one or more ACD systems that an organization operates. The DRE 126 assists with load balancing calls across large and distributed call centers. The DRE 126 has routing logic that determines the call segmentation and selects the destination to route the incoming call.

The DRE 126 has a routing service component that provides routing decisions for the incoming channels, such as voice or email, based on the routing criteria provided by the custom scripting tool 128. Based on routing decisions, the DRE 126 determines the next destination of the call. The DRE 126 selects the destination, for example, from a preconfigured group of possible destination skills across one or more ACD systems.

For example, the DRE 126 may route an incoming call to agent 132 of the available recipients 130. In another situation, the DRE 126 may route an incoming call to department ("dept") 134. Indeed, in other instances, the DRE 126 may route an incoming call to another ACD system, another location, another company, and the like.

In general, the DRE chooses a destination to attend each call. In doing this, the DRE often returns a value to the IVR. This value may be called a VDN. A vector directory number (VDN) is an extension on an automatic call distributor that directs an incoming call to a "vector"—a user-defined sequence of functions that may be performed, such as routing the call to a destination, giving a busy signal, or playing a recorded message.

The custom scripting tool 128 provides a mechanism for a programmer to instruct how the DRE 126 functions. In this way, the owner of the IVR system 100 can customize exactly how to manage incoming traffic based on any available relevant data, context, and rules. In some conventional approaches, the programmer must enter the custom scripts directly into the custom scripting tool 128 for "live" testing or implementation of the custom scripts.

Herein, "live" testing or implementation indicates that the script is executed by the DRE 126 with actual incoming traffic from actual callers. There is no opportunity to simulate conditions or contexts. This approach leads to unverified scripts being implemented on live DREs of one or more active ACD systems.

As depicted, the routing-script verification system 200 contains the scripts. The scripts are recorded in the routing-script verification system 200 or loaded from the custom scripting tool 128. In this way, only verified routing scripts are implemented on live DREs of one or more active ACD systems. The implementation on the custom script tool 128 may be accomplished automatically, manually, or a combination thereof. The routing-script verification system 200 verifies its scripts by testing them with a DRE emulator and under various testing conditions and contexts. Indeed, this may be doing in manner that is consistent with generally accepted DevOps practices and more particularly, with a DevOps pipeline.

The scripts may be stored as part of the routing-script verification system 200 or loaded from outside, such as from the custom scripting tool 128. After validation, the scripts need not be loaded immediately into the ACD system 120. The loading process may be performed manually, automatically, or semi-automatically.

Figure 2:
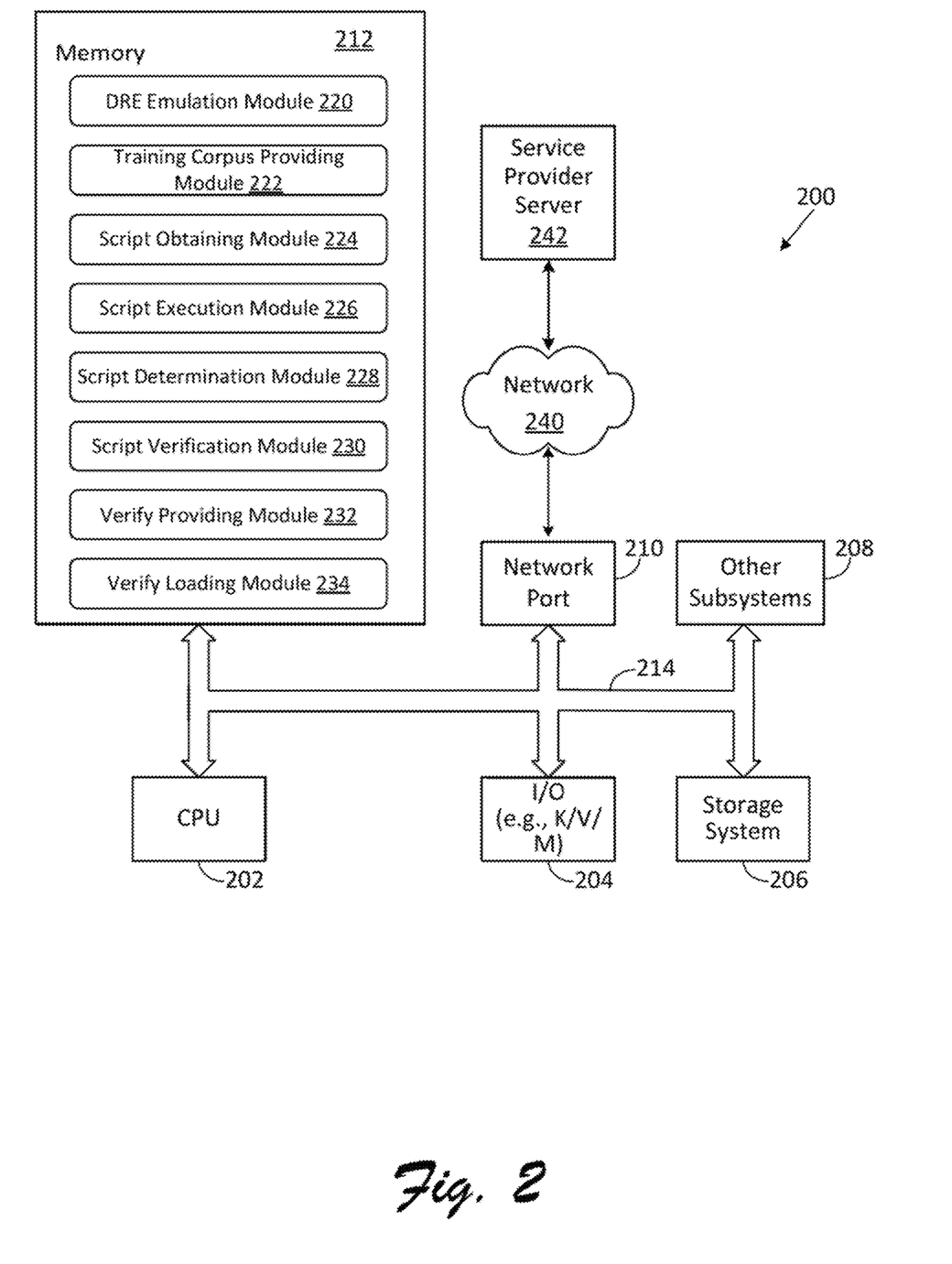
FIG. 2 illustrates a system configured to facilitate implementation of verified routing scripts for a Dynamic Routing Engine (DRE) of one or more Automatic Call Distribution (ACD) systems, in accordance with one or more implementations.

FIG. 2 is a generalized illustration of an information handling system that can be used to implement the example routing-script verification system 200. This example system configured to facilitate implementation of verified routing scripts for a Dynamic Routing Engine (DRE) of one or more Automatic Call Distribution (ACD) systems, in accordance with one or more implementations.

The example routing-script verification system 200 includes a processor (e.g., central processor unit or "CPU") 202, input/output (I/O) devices 204, such as a display, a keyboard, a mouse, and associated controllers, a storage system 206 (e.g., a hard drive), and various other subsystems 208. In various embodiments, the example routing-script verification system 200 also includes network port 210 operable to connect to a network 240, which is likewise accessible by a service provider server 242. The example routing-script verification system 200 likewise includes system memory 212, which is interconnected to the foregoing via one or more buses 214.

System memory 224 may store data and machine-readable instructions. The example routing-script verification system 200 may be configured by the machine-readable instructions. Machine-readable instructions may include one or more instruction modules. The instruction modules may include computer program modules. The instruction modules may include one or more of DRE emulation module 220, training corpus providing module 222, script obtaining module 224, script execution module 226, script determination module 228, script verification module 230, verify providing module 232, verify loading module 234, and/or other instruction modules.

DRE emulation module 220 may be configured to emulate a DRE of one or more ACD systems. The DRE may include an Avaya Dynamic Routing Environment.

DRE emulation module 220 set the input as the request attributes. For example AVAYA offers options where the input values include decisionFunctionName (name of the decision function script), decisionFunctionVersion (decision function version), from (customer number), to (toll free number used by the customer), customParameters (parameters used in the telecom process to send more information to the routing engine), segAttributes (this attribute contains business attributes used to segment the call to the agent through the routing rules), and channel (information of contact channel, example voice).

Training corpus providing module 222 may be configured to provide a training corpus to simulate inbound telephony calls to the DRE and simulate context of the simulated inbound telephony calls. A training corpus is a collection of data that may be useful for training or simulating a sequence of inbound traffic. The training corpus may include data regarding multiple incoming telephony calls and contextual data related to those multiple incoming telephone calls. Contextual data is data related to individual calls or groups of calls that provide context to those calls. For example, other contextual data may include request attributes; metrics of each destination; value of strategy variables; destination attributes; and global property of the destination.

Script obtaining module 224 may be configured to obtain to-be-executed routing scripts. A routing script is a set of instructions that direct or help direct the routing decisions of the DRE 126. For example, according to options offered by AVAYA, the scripts are built using the Groovy Language; Of course, other platforms may use other programming language.

Script execution module 226 may be configured to execute the routing scripts on emulated DRE with the provided training corpus to simulate inbound telephony calls to the DRE under the simulated context of the simulated inbound telephony calls.

The execution of the routing scripts on emulated DRE may be performed in accordance with call queue metrics and configuration data. Examples of validation behavior includes the use the input request to get the destinations, validating if the output parameters are the same that expected based over a context. Each context may be used express many information, as server configuration, destination properties, request date and time (emulating if was in the morning or at night or in a holiday) and metrics for any server entity.

Script determination module 228 may be configured to determine that the routing scripts executed within defined parameters. If the execution is within the defined parameters, then the script was successfully executed. According to options offered by suitable IVR systems (such as AVAYA), the validation can, for example, validate the same attributes returned by the server API (application programming interface), theses output parameters are populated by the groovy strategy scripts and may include timestamp (request timestamp), selectedDestId (selected destination identifier number), selectedDestNativeId (attribute native ID from the selected destination), selectedDestType (selected destination type, can be application, agent group or services), selectedDestName (attribute namefrom the selected destination), selectedDestAddress (destination address selected associated in the rule), extendedResponse (attribute to return more information to routing engine clients), resultCode (result code selected by the script), debugString (message encoded with all routing script steps to be used to troubleshoot), interactionId (the interaction id value), countDecision (Boolean about the count behavior), locationName (location name of the selected destination), companyName (name of the company associated to the destination), segLabel (rule name selected on the segmentation table), segTable segmentation table name), and strategySettingsName (strategy settings name).

The emulator may enable validating more than the expected routing response, providing all information about the routing process used to be recorded on solution database. Examples of defined parameters that are offered by suitable IVR systems (such as AVAYA), and, for example, recorded on solution database include selectedDestId (selected destination identifier number), selectedDestNativeId (attribute native ID from the selected destination), selectedDestType (selected destination type, can be application, agent group or services), selectedDestName (attribute name from the selected destination), selectedDestAddress (destination address selected associated in the rule), extendedResponse (attribute to return more information to routing engine clients), resultCode (result code selected by the script), debugString (message encoded with all routing script steps to be used to troubleshoot), interactionId (the interaction id value), from (customer number), countDecision (Boolean about the count behavior), fromContactAddr (customer number), toAddr (toll free number used by the customer), fromContactId (customer contact ID), fromClientApp (routing engine client name), fromClientIP (routing engine client IP), respTime (routing script response time), drServer (routing engine server name), dfScript (decision function script name), dfScriptId (decision function script identifier number), segTable (segmentation table name), segTableId (segmentation table identifier), segLabel (rule name selected on the segmentation table), strategySettingsName (strategy settings name), strategyScriptName (selected strategy script name), strategyScriptId (strategy script identifier), selectedDestQlf (selected destination alias name), bizData1 (free column to be populated with additional information), bizData2 (free column to be populated with additional information), bizData3 (free column to be populated with additional information), bizData4 (free column to be populated with additional information), bizData5 (free column to be populated with additional information), channel (information of contact channel, example voice), segAttributes (this attribute contains business attributes used to segment the call to the agent through the routing rules), customParameters (parameters used in the telecom process to send more information to the routing engine), companyName (name of the company associated to the destination), companyId (identifier of the company associated to the destination), locationName (location name of the selected destination), locationId (destination location name), routingServiceInstance (routing service instance ID), selectedAcdId (ACD from the selected destination selected), and decisionFunctionName (name of the decision function script).

Script verification module 230 may be configured to, in response to the determination, verify the routing scripts. If the script was within the defined parameters, then the script is verified.

Verify providing module 232 may be configured to provide the verified routing scripts for execution on a live DRE of one or more active ACD systems. The routing scripts may include instructions that, when executed by the live DRE of one or more active ACD systems, actively processes multiple actual incoming telephony calls in real time to determine how and where to route such calls by the one or more active ACD systems. As used herein, "real time" refers to actual incoming traffic being processed as it is arriving.

Verify loading module 234 may be configured to automatically load and executing the verified routing scripts on the live DRE of the one or more active ACD systems.

In some implementations, the parameters may be defined to adhere to a DevOps pipeline. The defined parameters are determined by accepted DevOps practices and more particularly, with a DevOps pipeline. DevOps is a set of software development practices that combines software development (Dev) and information technology operations (Ops) to shorten the systems development life cycle while delivering features, fixes, and updates frequently in close alignment with business objectives. Using this tool, scripts may be tested before accepting any change in the routing script.

The example routing-script verification system 200 may include one or more processors configured to execute computer program modules. By way of non-limiting example, the example routing-script verification system 200 may include one or more of a desktop computer, a laptop computer, a handheld computer, a tablet computing platform, a NetBook, a Smartphone, a gaming console, and/or other computing platforms.

Storage system 206 may comprise non-transitory storage media that electronically stores information. The electronic storage media of storage system 206 may include one or both of system storage that is provided integrally (i.e., substantially non-removable) from a computer and/or removable storage that is removably connectable to a computer via, for example, a port (e.g., a USB port, a firewire port, etc.) or a drive (e.g., a disk drive, etc.). Storage system 206 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 226 may include one or more virtual storage resources (e.g., cloud storage, a virtual private network, and/or other virtual storage resources). Storage system 206 may store software algorithms, information determined by processor(s) 202, information received from a server, information received from a client computing platform(s), and/or other information that enables the example routing-script verification system 200 to function as described herein.

Processor(s) 202 may be configured to provide information processing capabilities. As such, processor(s) 202 may include one or more of a digital processor, an analog processor, a digital circuit designed to process information, an analog circuit designed to process information, a state machine, and/or other mechanisms for electronically processing information. Although processor(s) 202 is shown in FIG. 2 as a single entity, this is for illustrative purposes only. In some implementations, processor(s) 202 may include a plurality of processing units. These processing units may be physically located within the same device, or processor(s) 202 may represent processing functionality of a plurality of devices operating in coordination.

Processor(s) 228 may be configured to execute modules 220, 222, 224, 226, 228, 230, 232, and/or 234, and/or other modules. Processor(s) 202 may be configured to execute modules 220, 222, 224, 226, 228, 230, 232, and/or 234, and/or other modules by software; hardware; firmware; some combination of software, hardware, and/or firmware; and/or other mechanisms for configuring processing capabilities on processor(s) 202. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 220, 222, 224, 226, 228, 230, 232, and/or 234 are illustrated in FIG. 2 as being implemented within a single processing unit, in implementations in which processor(s) 202 includes multiple processing units, one or more of modules 220, 222, 224, 226, 228, 230, 232, and/or 234 may be implemented remotely from the other modules. The description of the functionality provided by the different modules 220, 222, 224, 226, 228, 230, 232, and/or 234 described below is for illustrative purposes, and is not intended to be limiting, as any of modules 220, 222, 224, 226, 228, 230, 232, and/or 234 may provide more or less functionality than is described. For example, one or more of modules 220, 222, 224, 226, 228, 230, 232, and/or 234 may be eliminated, and some or all of its functionality may be provided by other ones of modules 220, 222, 224, 226, 228, 230, 232, and/or 234. As another example, processor(s) 202 may be configured to execute one or more additional modules that may perform some or all of the functionality attributed below to one of modules 220, 222, 224, 226, 228, 230, 232, and/or 234.

Figure 3A:
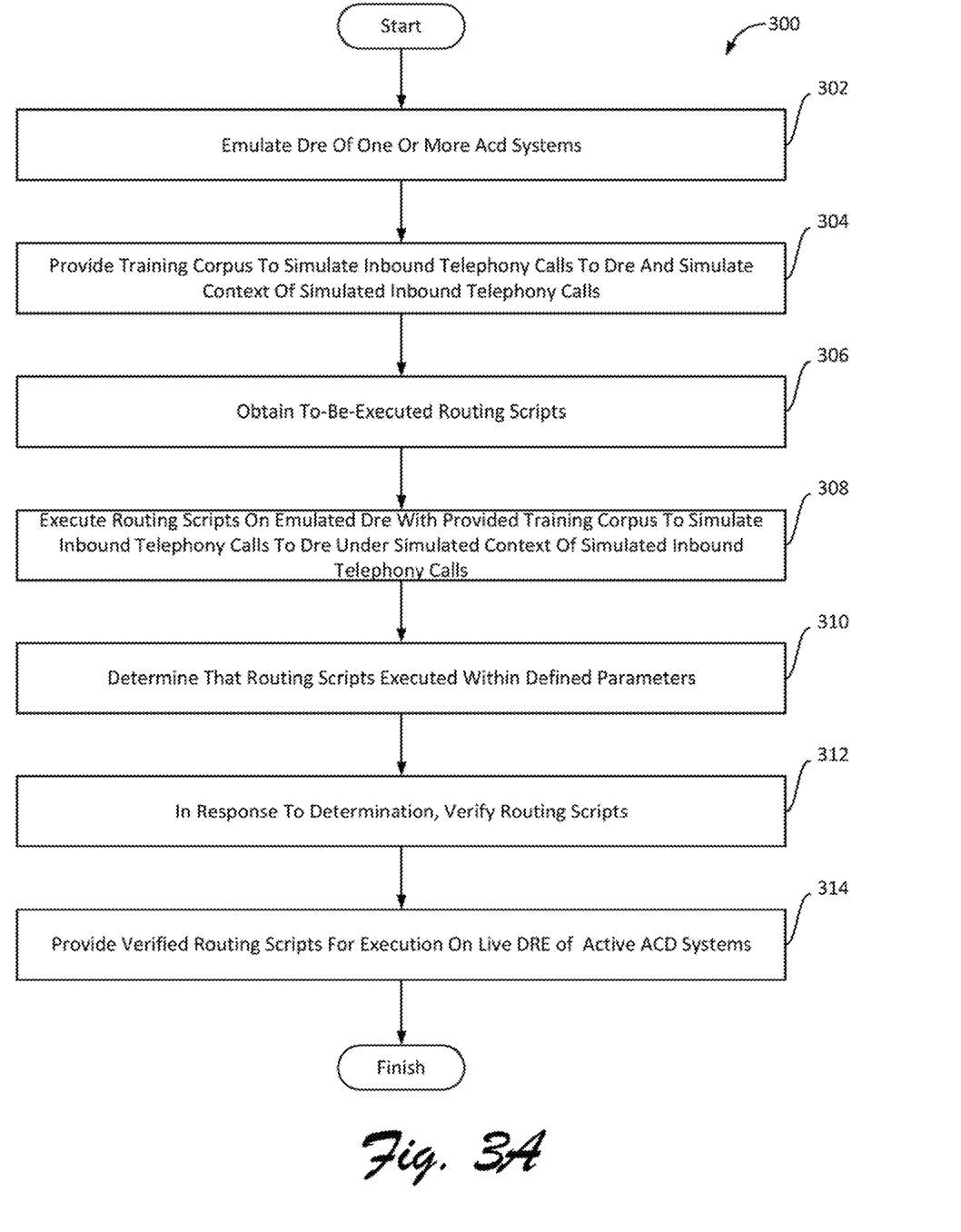
FIGS. 3A and/or 3B illustrates a method that facilitates implementation of verified routing scripts for a Dynamic Routing Engine (DRE) of one or more Automatic Call Distribution (ACD) systems, in accordance with one or more implementations.
Figure 3B:
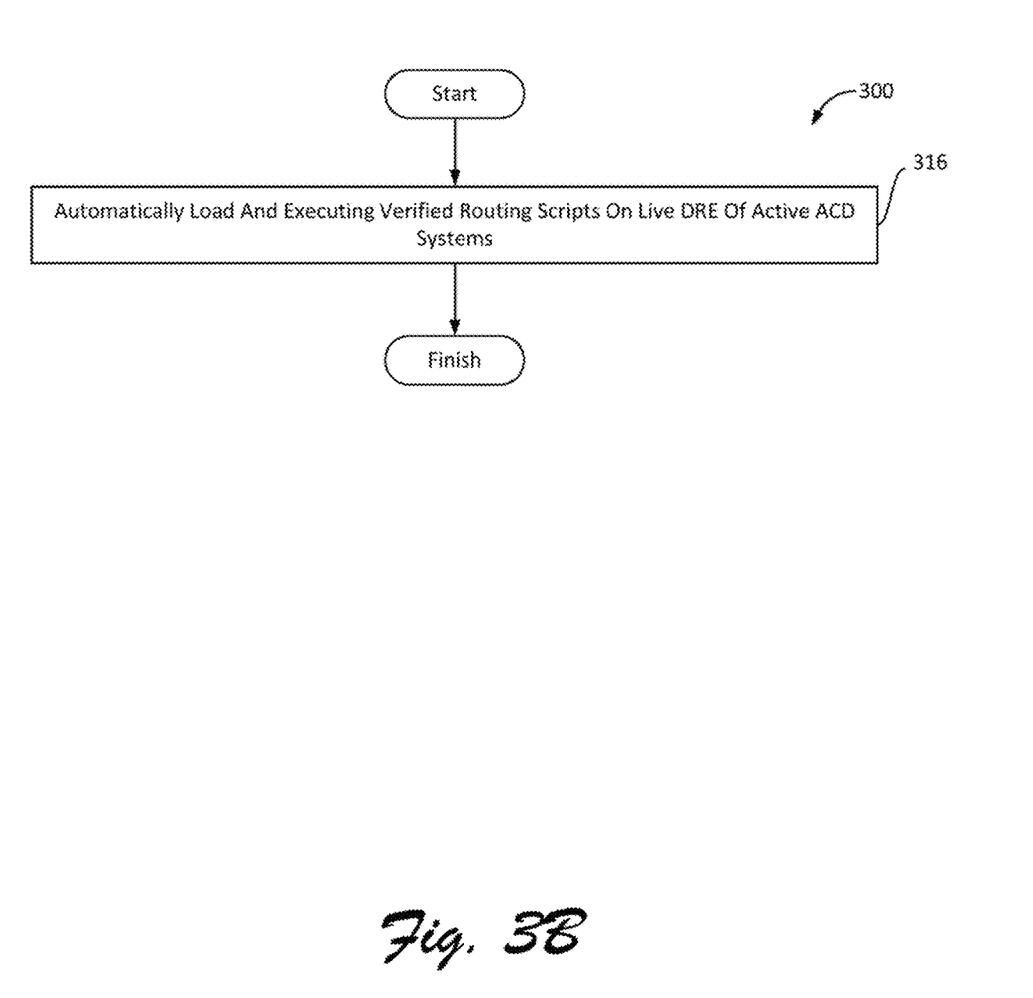

FIGS. 3A and/or 3B illustrates a method 300 that facilitates implementation of verified routing scripts for a Dynamic Routing Engine (DRE) of one or more Automatic Call Distribution (ACD) systems, in accordance with one or more implementations. The operations of method 300 presented below are intended to be illustrative. In some implementations, method 300 may be accomplished with one or more additional operations not described, and/or without one or more of the operations discussed. Additionally, the order in which the operations of method 300 are illustrated in FIGS. 3A and/or 3B and described below is not intended to be limiting.

In some implementations, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

FIG. 3A illustrates method 300, in accordance with one or more implementations.

An operation 302 may include emulating a DRE of one or more ACD systems. Operation 302 may be performed by one or more hardware processors configured by machine-readable instructions including a module that is the same as or similar to DRE emulation module 220, in accordance with one or more implementations.

An operation 304 may include providing a training corpus to simulate inbound telephony calls to the DRE and simulate context of the simulated inbound telephony calls. Operation 304 may be performed by one or more hardware processors configured by machine-readable instructions including a module that is the same as or similar to training corpus providing module 222, in accordance with one or more implementations.

An operation 306 may include obtaining to-be-executed routing scripts. Operation 306 may be performed by one or more hardware processors configured by machine-readable instructions including a module that is the same as or similar to script obtaining module 224, in accordance with one or more implementations.

An operation 308 may include executing the routing scripts on emulated DRE with the provided training corpus to simulate inbound telephony calls to the DRE under the simulated context of the simulated inbound telephony calls. Operation 308 may be performed by one or more hardware processors configured by machine-readable instructions including a module that is the same as or similar to script execution module 226, in accordance with one or more implementations.

An operation 310 may include determining that the routing scripts executed within defined parameters. Operation 310 may be performed by one or more hardware processors configured by machine-readable instructions including a module that is the same as or similar to script determination module 228, in accordance with one or more implementations.

An operation 312 may include in response to the determination, verifying the routing scripts. Operation 312 may be performed by one or more hardware processors configured by machine-readable instructions including a module that is the same as or similar to script verification module 230, in accordance with one or more implementations.

An operation 314 may include providing the verified routing scripts for execution on a live DRE of one or more active ACD systems. Operation 314 may be performed by one or more hardware processors configured by machine-readable instructions including a module that is the same as or similar to verify providing module 232, in accordance with one or more implementations.

FIG. 3B illustrates method 300, in accordance with one or more implementations.

An operation 316 may include further including automatically loading and executing the verified routing scripts on the live DRE of the one or more active ACD systems. Operation 316 may be performed by one or more hardware processors configured by machine-readable instructions including a module that is the same as or similar to verify loading module 234, in accordance with one or more implementations.

Additional and Alternative Implementation Notes

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

In the above description of example implementations, for purposes of explanation, specific numbers, materials configurations, and other details are set forth in order to better explain the present disclosure. However, it will be apparent to one skilled in the art that the subject matter of the claims may be practiced using different details than the examples ones described herein. In other instances, well-known features are omitted or simplified to clarify the description of the example implementations.

The terms "techniques" or "technologies" may refer to one or more devices, apparatuses, systems, methods, articles of manufacture, and/or executable instructions as indicated by the context described herein.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

These processes are illustrated as a collection of blocks in a logical flow graph, which represents a sequence of operations that may be implemented in mechanics alone, with hardware, and/or with hardware in combination with firmware or software. In the context of software/firmware, the blocks represent instructions stored on one or more non-transitory computer-readable storage media that, when executed by one or more processors or controllers, perform the recited operations.

Note that the order in which the processes are described is not intended to be construed as a limitation, and any number of the described process blocks can be combined in any order to implement the processes or an alternate process. Additionally, individual blocks may be deleted from the processes without departing from the spirit and scope of the subject matter described herein.

As will be appreciated by one skilled in the art, the technology described herein may be embodied as a method, system, or computer program product. Accordingly, embodiments of the technology described herein may be implemented entirely in hardware or a combination of hardware and software (including firmware, resident software, microcode, etc.) These various embodiments may all generally be referred to herein as a "circuit," "module," or "system."

Furthermore, the technology described herein may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the technology described herein may be written in an object oriented programming language such as Java, Smalltalk, C++ or the like. However, the computer program code for carrying out operations of the technology described herein may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the technology described herein are described with reference to flowchart illustrations and/or block diagrams of methods, apparatus (systems) and computer program products according to embodiments of the technology described herein. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The technology described herein is well adapted to attain the advantages mentioned as well as others inherent therein. While the technology described herein has been depicted, described, and is defined by reference to particular embodiments of the technology described herein, such references do not imply a limitation on the technology described herein, and no such limitation is to be inferred. The technology described herein is capable of considerable modification, alteration, and equivalents in form and function, as will occur to those ordinarily skilled in the pertinent arts. The depicted and described embodiments are examples only, and are not exhaustive of the scope of the technology described herein.

Consequently, the technology described herein is intended to be limited only by the spirit and scope of the appended claims, giving full cognizance to equivalents in all respects.

What is claimed is:

1. A system configured to facilitate implementation of verified routing scripts for a Dynamic Routing Engine (DRE) of one or more Automatic Call Distribution (ACD) systems, the system comprising:
   one or more hardware processors configured by machine-readable instructions to:
      emulate a DRE that is managed by a custom scripting tool to manage inbound telephony calls based on relevant data, context and rules, of one or more ACD systems, wherein the DRE is configured to load balance across distributed call centers of the ACD systems;
      provide a training corpus to simulate inbound telephony calls to the DRE and simulate context of the simulated inbound telephony calls;
      obtain to-be-executed routing scripts;
      execute the routing scripts on emulated DRE with the provided training corpus to simulate inbound telephony calls to the DRE under the simulated context of the simulated inbound telephony calls;
      determine that the routing scripts executed within defined parameters;
      in response to the determination, verify the routing scripts;
      provide the verified routing scripts for execution on a live DRE of one or more active ACD systems; and
      automatically load and execute the verified routing scripts on the live DRE.

2. The system of claim 1, wherein the one or more hardware processors are further configured by machine-readable instructions to automatically load and executing the verified routing scripts on the live DRE of the one or more active ACD systems.

3. The system of claim 1, wherein the training corpus includes data regarding multiple incoming telephony calls and contextual data related to those multiple incoming telephone calls.

4. The system of claim 1, wherein the DRE includes an Avaya Dynamic Routing Environment.

5. The system of claim 1, wherein the routing scripts includes instructions that, when executed by the live DRE of one or more active ACD systems, actively processes multiple actual incoming telephony calls in real time to determine how and where to route such calls by the one or more active ACD systems.

6. The system of claim 1, wherein the parameters are defined to adhere to a DevOps pipeline.

7. The system of claim 1, wherein the executing of the routing scripts on emulated DRE is performed in accordance with call queue metrics and configuration data.

8. A method that facilitates implementation of verified routing scripts for a Dynamic Routing Engine (DRE) of one or more Automatic Call Distribution (ACD) systems, the method comprising:
- emulating a DRE that is managed by a custom scripting tool to manage inbound telephony calls based on relevant data, context and rules, of one or more ACD systems, wherein the DRE is configured to load balance across distributed call centers of the ACD systems;
- providing a training corpus to simulate inbound telephony calls to the DRE and simulate context of the simulated inbound telephony calls;
- obtaining to-be-executed routing scripts;
- executing the routing scripts on emulated DRE with the provided training corpus to simulate inbound telephony calls to the DRE under the simulated context of the simulated inbound telephony calls;
- determining that the routing scripts executed within defined parameters;
- in response to the determination, verifying the routing scripts;
- providing the verified routing scripts for execution on a live DRE of one or more active ACD systems; and
- automatically loading and executing the verified routing scripts on the live DRE.

9. The method of claim 8, further comprising automatically loading and executing the verified routing scripts on the live DRE of the one or more active ACD systems.

10. The method of claim 8, wherein the training corpus includes data regarding multiple incoming telephony calls and contextual data related to those multiple incoming telephone calls.

11. The method of claim 8, wherein the DRE includes an Avaya Dynamic Routing Environment.

12. The method of claim 8, wherein the routing scripts includes instructions that, when executed by the live DRE of one or more active ACD systems, actively processes multiple actual incoming telephony calls in real time to determine how and where to route such calls by the one or more active ACD systems.

13. The method of claim 8, wherein the parameters are defined to adhere to a DevOps pipeline.

14. The method of claim 8, wherein the executing of the routing scripts on emulated DRE is performed in accordance with call queue metrics and configuration data.

15. A non-transient computer-readable storage medium having instructions embodied thereon, the instructions being executable by one or more processors to perform a method that facilitates implementation of verified routing scripts for a Dynamic Routing Engine (DRE) of one or more Automatic Call Distribution (ACD) systems, the method comprising:
- emulating a DRE that is managed by a custom scripting tool to manage inbound telephony calls based on relevant data, context and rules, of one or more ACD systems, wherein the DRE is configured to load balance across distributed call centers of the ACD systems;
- providing a training corpus to simulate inbound telephony calls to the DRE and simulate context of the simulated inbound telephony calls;
- obtaining to-be-executed routing scripts;
- executing the routing scripts on emulated DRE with the provided training corpus to simulate inbound telephony calls to the DRE under the simulated context of the simulated inbound telephony calls;
- determining that the routing scripts executed within defined parameters;
- in response to the determination, verifying the routing scripts;
- providing the verified routing scripts for execution on a live DRE of one or more active ACD systems; and
- automatically loading and executing the verified routing scripts on the live DRE.

16. The computer-readable storage medium of claim 15, wherein the method further comprises automatically loading and executing the verified routing scripts on the live DRE of the one or more active ACD systems.

17. The computer-readable storage medium of claim 15, wherein the training corpus includes data regarding multiple incoming telephony calls and contextual data related to those multiple incoming telephone calls.

18. The computer-readable storage medium of claim 15, wherein the DRE includes an Avaya Dynamic Routing Environment.

19. The computer-readable storage medium of claim 15, wherein the routing scripts includes instructions that, when executed by the live DRE of one or more active ACD systems, actively processes multiple actual incoming telephony calls in real time to determine how and where to route such calls by the one or more active ACD systems.

20. The computer-readable storage medium of claim 15, wherein the parameters are defined to adhere to a DevOps pipeline.

* * * * *